United States Patent
Schmiedhofer

(10) Patent No.: US 10,377,417 B2
(45) Date of Patent: Aug. 13, 2019

(54) METHOD FOR DETECTING A CONTROL SITUATION OF A VEHICLE WITH AN AUTOMATIC CONTROL SYSTEM

(71) Applicant: AUDI AG, Ingolstadt (DE)

(72) Inventor: Klaus Schmiedhofer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 33 days.

(21) Appl. No.: 15/842,999

(22) Filed: Dec. 15, 2017

(65) Prior Publication Data

US 2018/0201309 A1 Jul. 19, 2018

(30) Foreign Application Priority Data

Jan. 18, 2017 (DE) .................. 10 2017 200 713

(51) Int. Cl.
 *B62D 6/08* (2006.01)
 *B62D 1/28* (2006.01)
 *B62D 3/12* (2006.01)

(52) U.S. Cl.
 CPC .............. *B62D 6/08* (2013.01); *B62D 1/286* (2013.01); *B62D 3/12* (2013.01)

(58) Field of Classification Search
 CPC ............. B62D 1/286; B62D 3/12; B62D 6/08
 See application file for complete search history.

(56) References Cited

U.S. PATENT DOCUMENTS

| | | | | |
|---|---|---|---|---|
| 6,053,270 A * | 4/2000 | Nishikawa | .......... | B60R 21/2037 180/168 |
| 9,555,824 B2 * | 1/2017 | Preijert | ................. | B62D 1/16 |
| 9,868,464 B2 * | 1/2018 | Lee | ................. | B62D 15/025 |
| 2007/0192005 A1 * | 8/2007 | Ishikawa | ............. | B62D 5/008 701/41 |
| 2007/0256885 A1 * | 11/2007 | Ammon | ............. | B62D 5/008 180/417 |
| 2012/0101687 A1 * | 4/2012 | Svensson | ............. | B62D 5/0472 701/42 |
| 2015/0329141 A1 * | 11/2015 | Preijert | ................ | B62D 1/16 701/41 |

FOREIGN PATENT DOCUMENTS

| | | |
|---|---|---|
| DE | 102010027356 A1 | 1/2012 |
| DE | 102011016052 A1 | 10/2012 |
| DE | 102014208926 A1 | 6/2015 |

OTHER PUBLICATIONS

German Search Report dated Jul. 31, 2017 of corresponding German application No. 102017200713.3; 7 pgs.

* cited by examiner

*Primary Examiner* — Tyler J Lee
(74) *Attorney, Agent, or Firm* — Maier & Maier, PLLC

(57) ABSTRACT

A method for detecting a control situation of a vehicle comprising an automatic control system. A steering torque curve applied to the steering of the vehicle is subdivided into sections in which the steering torque curve steadily rises or falls, and an angular acceleration caused by a driver and detected by a first steering angle sensor at the beginning of the respective section by a first part of the steering rod as a first angular acceleration is compared to a second angular acceleration detected by a second steering angle sensor at the beginning of a respective section caused by an automatic control system with a toothed rack connected to the steering rod or a second part of the steering rod. Depending on a result of the comparison, a corresponding steering torque curve of the respective section is assigned to the driver or to the automatic control system.

12 Claims, 1 Drawing Sheet

METHOD FOR DETECTING A CONTROL SITUATION OF A VEHICLE WITH AN AUTOMATIC CONTROL SYSTEM

FIELD

The present invention relates to a method for detecting a control situation of a motor vehicle with an automatic control system and a steering system for a vehicle.

BACKGROUND

In particular with autonomous driving of a vehicle by means of an automatic control, the steering maneuvers that are carried out by the automatic system are reported back to a driver via a steering torque that is applied to a steering wheel of the vehicle. In this case, the driver can "override" a steering torque predetermined by the automatic control system so that the driver provides a steering torque that is greater than the steering torque provided by the automatic control system.

Since as a rule, only one sensor is used to determine a current steering angle or the steering state of a vehicle which measures a current steering torque, an unequivocal assignment of a currently applied steering torque to the steering of the vehicle, namely either to the automatic control system or to the driver is not possible.

In particular in situations in which the cause of a steering angle changes, such as for example with an intervention of a driver in a driving operation when a vehicle has been controlled over a period of time by means of an automatic control system, the knowledge that the driver of the vehicle controls or would like to control the vehicle is very important for the adjustment of the driving dynamic systems of the vehicle.

The German document DE 10 2010 027 356 A1 discloses a method wherein a steering torque is determined as a function of a target value for a control variable for adjusting a steering angle.

A method according to which the steering behavior of a vehicle is adjusted as a function of a respective engine characteristic curve is disclosed in the German document 10 2011 016 052 A1. In the German document 10 2014 208 926 A1 is disclosed a method for detecting a steering torque for supporting a steering torque to be applied by a driver, wherein a steering torque that is applied by a driver is adjusted according to a steering torque that is applied by a steering system.

SUMMARY

Against this background, the objective of the present invention is to provide a method that enables a clear assignment of a steering angle change to a driver or to an automatic control system.

In order to achieve the objective mentioned above, a method is proposed for detecting a control situation of a vehicle with an automatic control system. For this purpose, a steering torque process is provided which is applied to the steering of the vehicle and which is subdivided into sections in which the steering torque curve steadily rises or falls. At the beginning of a respective section, a first angular acceleration, which is caused by the driver of the vehicle and which is caused by an automatic control system, is detected by a first steering angle sensor of the vehicle, and at the beginning of a respective section, a second steering angle sensor of the vehicle detects a respective section with a second angular acceleration of a toothed rack, which is connected to the steering rod, or compares it to a second angular acceleration obtained with the second part of the steering rod. At the same time, it is provided that depending on a result of the comparison of the first angular acceleration to the second angular acceleration, a steering torque curve corresponding to the respective section is assigned to the driver or to the automatic control system.

The proposed method is used in particular to control a steering system of a motor vehicle. For this purpose, it is provided that when a steering change of the vehicle or a corresponding steering torque change is determined, it is determined whether the steering angle change was caused by a driver of the vehicle, or by an automatic control system such as for example an electric stabilization program (ESP), or by a program for autonomous driving.

In order to determine a cause of a change of the steering angle, according to the invention it is provided that a steering torque curve which has led to the change of the steering angle is subdivided into sections. At the same time, the sections are selected in such a way that the steering torque curve is within a section that is steadily increasing or steadily falling. This means that when the steering torque curve indicates a point of change, a current section ends. Accordingly, the respective sections are formed dynamically with respect to their length. In particular, it is provided that no section is formed in the case when there is no change of the steering angle, which means that no change is present in the steering torque curve.

As soon as a section is determined, which is to say that a change was detected in the steering torque curve which ends a steady rise or fall of the steering torque curve, it can be determined whether the steering torque curve is associated with a driver or with an automatic control system of a respective vehicle.

For this purpose, it is provided that at the beginning of the section, the first angular acceleration that was determined by a first steering angle sensor is compared to a second angular acceleration determined at the beginning of the section of by a second steering angle sensor. Based on a result of the comparison, it can be determined whether the angular acceleration detected by the first steering angle sensor or the angular acceleration determined by the second steering angle sensor is greater. Depending on whether the steering acceleration that was determined by the first steering angle sensor, the steering angle acceleration that was determined by the second steering sensor is greater, it can then be concluded that a steering wheel is "turned along" by the automatic control system, or that the driver has "overruled" the automatic control system.

It is provided that a steering angle change within a certain range is assigned to the cause which resulted in the largest angular acceleration at the beginning of the section. This means that the driver is deemed to cause the steering angle change in the section when the first steering angle acceleration detected by means of the first steering angle sensor at the beginning of the section is greater than the second steering angle acceleration detected by means of the second steering angle sensor at the beginning of the section and vice versa.

When at the beginning of the section, which is to say for example 1,000 meters or 500 meters after the beginning of the section, the detected first angular acceleration is greater than the second angular acceleration determined by the second steering angle sensor at the beginning of the section, this means that the driver has turned on an actuator for "turning along" that is used by an automatic control system.

Accordingly, the driver will found out about it from the actuator that is used by the automatic control system, or from the toothed rack moved by the automatic control system, or from a corresponding second part of a steering rod, which is turned only a little later in comparison to a first part of the handlebar. This applies both to the buildup and to the reduction of a torque for moving the respective parts of the steering rod or of the toothed rack.

In the case when the automatic control system at the beginning of a respective section provides angular acceleration that is greater than the angular acceleration provided by a driver at the beginning of the section, it can be assumed that a first part of the steering rod moved by the driver was "turned along" by the automatic control system. Accordingly, the first part of the steering rod undergoes an angular acceleration only slightly later in comparison to an actuator used by the automatic control system, or to the toothed rack moved by an automatic control system, and therefore also in comparison to the second part of the steering rod.

If a plurality of sections are built over the duration of a journey of a vehicle which are assigned either to an automatic control system of the vehicle or to a driver, it is possible to deduce the control situation of the vehicle based on the sequence or the distribution pattern of the assignment of the individual sections to the control situation of the vehicle. This means that based on the sequence or the distribution pattern of the assignment of the individual sections, it can be concluded whether the driver is participating in the control of the vehicle and for what purpose the driver provides the respective control impulses. While taking into account the information that is provided in this manner about the control behavior of the driver, the vehicle can be adjusted to a current steering situation or to a goal of the driver.

So for example, it can be provided that when the driver is continuously correcting a central alignment predetermined by the automatic control system, or a central alignment with the traffic lane and the automatic control system is configured to no longer align the vehicle centrally, but to align it to with the side strip. This can occur when the vehicle or the driving lane were centrally aligned and the driver provides in a next section a steering an impulse that is opposite to the central orientation, wherein the vehicle is for example aligned with a side strip and it is thus concluded that the has made a correction to the orientation of the vehicle.

In order to determine the first and the second angular speed, it is provided that a first angular speed that is determined within a section by means of a first steering angle sensor and a second steering angular speed that is determined within a section by means of a second steering angle sensor are evaluated.

In order to evaluate the distribution of respective assignments of sections and of the steering torques applied in respective sections, a histogram can be created representing for example information about the assignments of respective sections and corresponding steering torques determined within a predetermined time period.

In one possible embodiment of the proposed method it is provided that in a respective section, the steering torque acting on the steering is determined by means of an integral of the steering torque curve over the duration of the section and it is assigned to the respective section.

In order to detect a steering pulse or a corresponding torque provided in a section, an integral of a steering torque curve detected by a steering torque sensor can be calculated over the section. Accordingly, a steering torque provided in the section can be associated with the section and assigned to a driver or to an automatic control system. This means that by means of a steering angle acceleration at the beginning of each section, the section can be assigned to the driver or to the automatic control system and it is possible to detect by means of the integral of the steering torque curve which steering torque or which steering angle change was provided by the driver or by the automatic control system in the section.

In order to adapt the steering system for example to the driving behavior of a driver, it can be provided that a difference between the steering torques determined in respective sections assigned to the respective driver and the steering torques determined in sections assigned to the automatic control system is minimized. This means that the automatic control system is configured to provide a force to be applied to providing steering angle change or a corresponding steering torque in the direction and in the magnitude of a force matching for example one or more preceding sections of the driver, for example matching the force or the torque provided by the driver in one or several sections of the current sections. Accordingly, the forces or the torques provided by the automatic control system are identical to the forces or the torques provided by the driver, so that a correction of the forces or torques provided can be omitted. It can be of course also provided that the automatic control system operates in emergency situations, or situations that are specified in a catalogue of criteria for a predetermined situation, independently of the force that is provided by the driver, or of the torque that is applied by the driver.

It is in particular provided that a steering torque curve of a steering system of a vehicle, which is to say a curve of a steering torque affecting the steering system by means of a driver via a steering rod or by means of an automatic control system via a toothed rack, is determined by means of a torque sensor arranged between the steering rod and the toothed rack.

In a further possible embodiment of the proposed method it is provided that in the case when all of the sections are assigned for a predetermined period of time to the automatic control system, a steering situation is recognized in which the driver does not provide any control commands via the steering wheel of the vehicle and the vehicle is to be controlled predominantly by means of the automatic control system.

When the vehicle is controlled by means of a s steering system which is configured for automatic control systems, situations may occur in which a driver of the vehicle completely relinquishes the control of the vehicle to the automatic control system. In order to recognize such a situation and to adjust the control system automatically to a correspondingly changed driving situation, it can be provided that in the event when all the sections are assigned for a predetermined period of time to the automatic control system, namely in the case of a so called "hands off scenario", it is assumed that the driver is no longer active and the vehicle is to be controlled in an autonomous driving mode.

In particular in situations in which the driver suddenly must interrupt the control of the vehicle, for example because he became ill and cannot communicate this interruption to the vehicle, an automatic recognition is provided of the current situation that is highly relevant to the safety of the driver.

In a further possible embodiment of the proposed method it is provided that in the case when the vehicle is currently in a state in which the vehicle is to be driven by means of the automatic control system, which is to say in an autonomous driving mode, and at least one section is assigned to the driver, a control situation is detected in which the driver would like to switch from an automatic control situation to a manual control situation and the vehicle is to be driven predominantly by means of control commands provided by the driver.

To enable harmonious switching from an autonomous driving mode to a predominantly or completely manually controlled driving mode so that the driver does not have to communicate to the vehicle that he would like to take over the control, it can be provided that when the vehicle is currently in an autonomous driving mode and at least one section is assigned to the driver, the autonomous driving mode is ended and an at the most partially automatic operation of the vehicle is activated, in which steering impulses issued by the driver lead to a change of the steering angle. In order to avoid switching from the autonomous driving mode to the at the most partially automated operation of the vehicle due to an accidental touching of the steering wheel by a driver, it can be provided that the switching will take place only when several sections are assigned to the driver and/or a torque is provided in the section provided by the driver which is above a predetermined threshold value.

In a further possible embodiment of the proposed method, it is provided that a distribution of the assignments of the respective section to the driver or to the automatic control system is determined over a predetermined time period and based on the distribution of the assignments, the vehicle is controlled predominantly by means of control commands provided by the automatic control system, or predominantly by means of the control commands provided by the driver.

In order to set an operating mode of an operating control system of a vehicle, which is to say to switch automatically for example form a driving mode "autonomous driving" to a "manual" driving mode or vice versa, it is necessary that an operating mode that is currently desired by the driver be recognized. In order to recognize the operating system that is currently desired by the driver, it can be provided that a distribution of the assignments of the respective sections to the driver or to the automatic control system, or a logical connection between chronologically successive assignments during a predetermined period is evaluated. A histogram can be provided for this purpose, which is to say a frequency distribution which is created for the sections assigned to the driver and/or to the automatic control system in the predetermined period of time. Based on the histogram, it can be determined who, namely whether the driver or the automatic control system, in which section and at what intensity level, which is to say with which torque, and how often, influenced a steering system of the vehicle. While taking into account a steering torque that acts on the steering system in a respective segment, it is further also possible to infer the direction of the change of the steering angle.

This means that based on such a distribution, it can be concluded whether a driver was patronized, which is to say continuously overridden by the automatic control system, or whether the driver is currently certain or uncertain, or whether the driver accepts the conduct of the automatic control system. Accordingly, it can be provided that based on the distribution of the assignments of the respective sections and of the steering torques provided in the sections, a situation of the driver in one of the three categories is classified as "certain", "uncertain" and "patronized".

For example, in the case in which a first segment is determined in which an automatic control system increased a current steering torque, and a second section is determined after that in which a driver reduces a current torque or provides a steering impulse that is opposite to the steering impulse provided by the automatic control system, it can be assumed that the automatic control system has "overridden" or patronized the driver in the first section and the driver has not accepted the driving conduct of the automatic control system.

In another possible embodiment of the proposed method it is provided that the distribution of the assignments by means of machine learning of a situation in which the vehicle is predominantly controlled by control commands provided by means of the automatic control system, or of a situation in which the vehicle assignments pertain to the case when the vehicle is controlled predominantly by means of control commands provided by the driver.

In order to assign determined associations of respective sections which are assigned to a driver or to an automatic control system automatically based on a driver situation or a predetermined class, and to preset the automatic control system for the driving situation or the class, a machine learning method, such as for example an artificial neural network or a so called "Support Vector Machine" is used, which assigns, for example according to a predetermined or self-taught schemes, to respective distributions of assignments of driving situations. While using a machine learning method, an individual adjustment of an assignment conduct of respective distributions of assignments to driving situations can take place while taking into account individual preferences of the driver. At the same time, the rules that have been learned with respect to one driver for assigning a distribution to a driving situation can be stored for example in a driver's profile or exported to be used for another driver.

The present invention further relates also to a steering system for vehicles provided with a first steering sensor, a second steering sensor and a steering device, wherein the steering device is configured to divide a steering torque curve which was applied to the steering of the vehicle into sections in which the steering torque curve is steadily rising or falling, and wherein the control device is further configured to sense a first angular acceleration of a first part of a steering rod of the vehicle that was caused by a driver of the vehicle and detected by a first steering angle sensor of the vehicle at the beginning of each section, and angular acceleration that was caused by an automatic steering control system of the vehicle, and compare it to a second angular acceleration sensor for a second angular acceleration which is connected to the toothed rack or to a second part of the steering rod at the beginning of a respective detected section, and to assign the corresponding steering moment depending on the result of the comparison of the steering torque curve of a corresponding section to the driver, or to the automatic control system.

The proposed control system is used in particular to carry out the described method.

In a possible embodiment of the proposed control system it is provided that the first steering angle sensor is configured to detect a movement of the steering rod in an area between a steering wheel of the vehicle and a superposition steering. It is further also provided that the second steering angle sensor is configured to detect a movement of the steering rod that is mediated by the toothed rack in an area between the toothed bar and the superposition steering.

It is of course also conceivable that the second steering angle sensor is configured to detect a movement of the toothed bar directly on the toothed bar.

Further advantages and embodiments will become evident from the description of the attached figures.

It goes without saying that the features named above and the those that are explained below can be used not only in the indicated combinations, but also in other combinations, without deviating from the scope of the present invention.

BRIEF DESCRIPTION OF THE FIGURES

The invention will be next described in detail with reference to schematic illustrations with reference to the attached drawings.

DETAILED DESCRIPTION OF THE FIGURES

Figure 1:
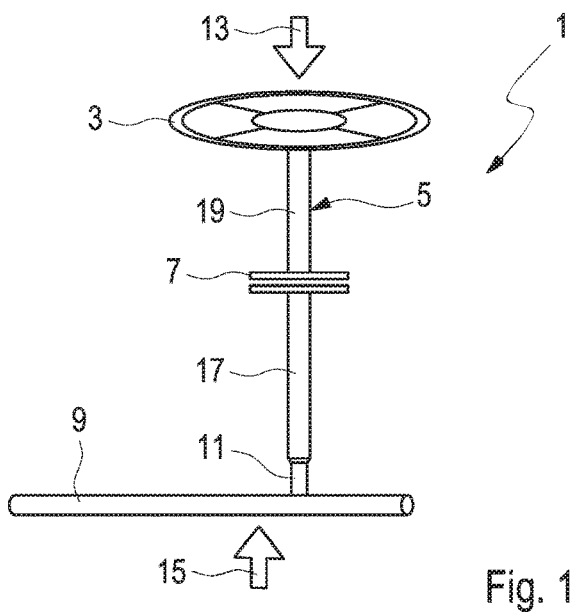
FIG. 1 shows a schematic representation of a steering system carrying out one possible embodiment of a steering system configured to carry out the method according to the invention.

As shown in FIG. 1, a steering system 1 is provided with a steering wheel 3, a steering rod 5, which is equipped with superposition steering 7, and with a toothed rack 9, which is connected via a torsion bar 11 to the steering rod.

In order to change a steering angle of the steering system 1, the driver can move the steering wheel 3 as indicated by an arrow 13, so that the steering rod 5 is rotated. The rotation is transmitted by the torsion bar 11 of the steering rod 5 to the toothed rack 9 and finally to the respective wheels of a vehicle comprising the steering system 1.

It is conceivable that the torsion bar 11 is used to detect a steering torque that acts on the toothed rack. Accordingly, a steering torque is detected when it is applied via the torsion bar 11 both by the driver by means of the steering wheel 3, and also when it is provided by an automatic control system via an actuator impacting the toothed rack 9, as indicated by the arrow 15.

The superposition steering 7 serves as a kind of coupling between a part of the steering system 1 to be operated by the driver and a part of the steering system 1 to be actuated by the automatic control system. Accordingly, it may happen that a second part 17 of the steering rod 5 arranged below the superposition steering 7 is moved by the automatic control system via the toothed rack 9 in a first direction, and a first part 19 of the steering rod 5 arranged above the superposition steering 7 is moved in a second direction via the steering wheel 3 by the driver, which is opposite to the first direction. Depending on the strength of the torque provided by the steering system or by the driver, the toothed rack 9 will be moved in the first or in the second direction and the part 17 or the part 19 will be "moved along".

In order to detect the torque acting on the first part 19 or the corresponding angular speed by means of which the torque acting on the first part 19 can be calculated, a steering angle sensor is provided on the first part 19. Accordingly, a second steering angle sensor is provided on the second part 17.

Figure 2:
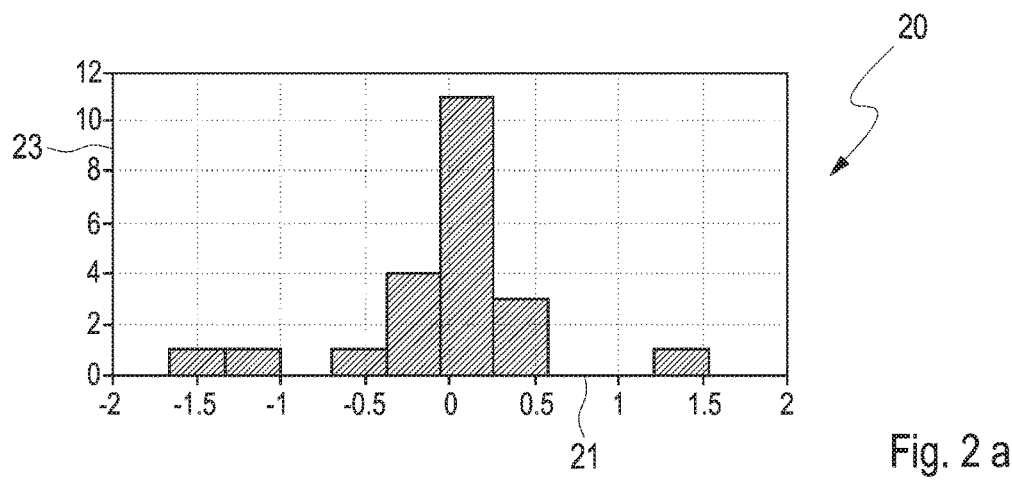
FIG. 2a shows a distribution of steering torques determined by means of a first steering angle sensor when carrying out one possible embodiment of the method according to the invention.
FIG. 2b shows a distribution of steering torques determined by means of a second steering angle sensor when carrying out one possible embodiment of the method according to the invention.
Figure 2:
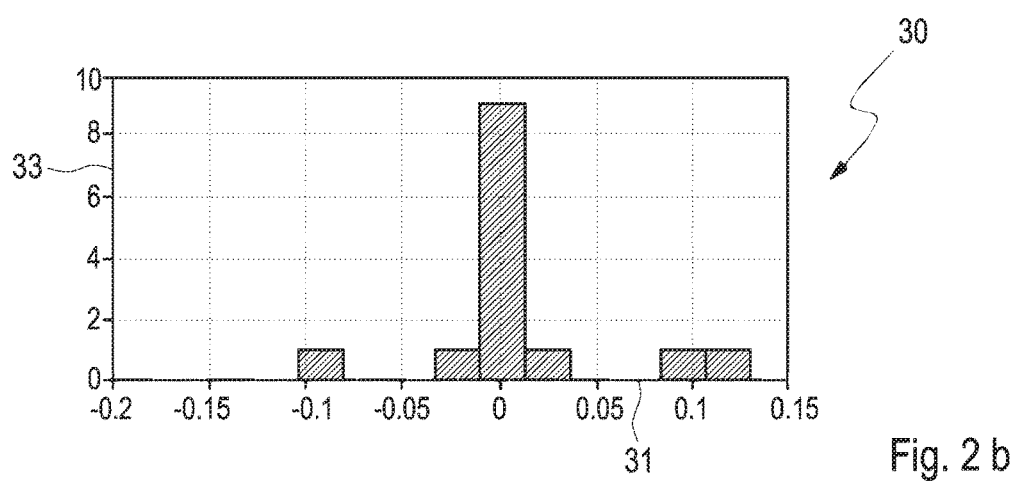

In FIG. 2a is illustrated a histogram 20 in the form of a diagram, which shows the torque generated or reduced by a driver on the horizontal axis 21 in [Nm] spread over a frequency which is indicated on the vertical axis 23. Accordingly, the bars shown in the diagram indicate a number of areas in which the buildup or reduction of the torque was detected, which are assigned to the driver of a corresponding vehicle.

In this case, the assignment of a respective area to the driver occurs when the driver has provided in this area a larger steering torque than an automatic control system of the vehicle.

The histogram 20 shows that the driver often provides a small steering torque in the range between −0.5 and 0.5 Nm, but rarely provides strong steering torques of −1.5 or 1.25. This means that the driver has often made slight corrections within a time range on which the histogram is based, or has often made slight corrections, for example by turning the steering wheel, but then has released again the steering wheel, and as a result, the steering torque has been accordingly reduced.

In comparison to that, the histogram 30 has the form of a diagram which is spread out on the horizontal axis 31 with a steering torque in [Nm] that is generated or reduced by an automatic control system of the vehicle, and over frequency indicated on the vertical axis 33, which shows that the automatic control system has significantly increased or reduced small steering torques. In this case, a changed scaling of the horizontal axis 31 should be in particular taken into account in comparison to histogram 20.

The histograms 20 and 30 therefore represent the steering torque curves of a scenario in which the automatic control system is activated and attempts to try to align the vehicle centrally in a driving lane. Since the driver would like to have the vehicle aligned with the side strip, he is continuously correcting with small steering movements the orientation of the vehicle.

The invention claimed is:

1. A method for detecting a control situation of a vehicle comprising:
   applying a steering torque curve to steering of the vehicle and subdividing the curve into sections based on a steady rise or fall of the curve;
   detecting a first angular acceleration at a beginning of a respective section of the curve by a first steering angle sensor of the vehicle on a first part of a steering rod;
   detecting a second angular acceleration at the beginning of the respective section of the curve by a second steering angle sensor of the vehicle on a second part of the steering rod;
   comparing the first angular acceleration to the second angular acceleration; and
   assigning a designation of a driver or an automatic control system to a corresponding steering torque curve of the respective section depending on a result of the comparison of the first angular acceleration to the second angular acceleration.

2. The method according to claim 1, further comprising:
   determining a steering torque impacting the steering in a respective section by an integral of the steering torque curve over the duration of the section;
   associating the steering torque with the section; and
   assigning one of the designations to the respective section based on the steering torque.

3. The method according to claim 2, further comprising:
   dynamically controlling the automatic control system so that a difference between the steering torque determined in respective sections and assigned to the designation of the driver, and the steering torque in a respective sections and assigned to the designation of the automatic control system, is minimized.

4. The method according to claim 1, wherein the steering torque curve is determined by a steering torque sensor arranged between the steering rod and the toothed rack.

5. The method according to claim 1, further comprising:
making a conclusion about the current control situation of the vehicle based on a sequence of sections assigned to the driver or to the automatic control system; and
regulating the automatic control system based on the detected current situation.

6. The method according to claim 5, further comprising:
recognizing an automatic control situation when all sections of the steering torque curve are assigned for a predetermined period of time to the automatic control system, and predominantly controlling the vehicle by the automatic control system.

7. The method according to claim 6, further comprising:
detecting, when the vehicle is in the automatic control situation, at least one section assigned to the driver, and switching from the automatic control situation to a manual control situation, wherein the vehicle is controlled predominantly by control commands provided by the driver.

8. The method according to claim 5, further comprising:
recognizing a distribution of assignments of respective sections to the driver or to the automatic control system over a predetermined time period; and
based on the distribution of the assignments, controlling the vehicle predominantly by control commands provided by the automatic control system or predominantly by control commands provided by the driver.

9. The method according to claim 8, wherein the distribution of the assignments is carried out by machine learning relating to a situation in which the vehicle is controlled predominantly by control commands provided by the automatic control system, and a situation in which the vehicle is controlled predominantly by the control commands provided by the driver.

10. The method according to claim 1, wherein the first part of the steering rod is separated from the second part of the steering rod by superposition steering.

11. A steering system for a vehicle comprising:
a steering device;
a first steering angle sensor on a first part of a steering rod, the first steering angle sensor detecting a first angular acceleration caused by a driver of the vehicle;
a second steering angle sensor on a second part of the steering rod, the second steering angle sensor detecting a second angular acceleration caused by an automatic control system; and
a control device configured to subdivide a steering torque curve applied to steering of the vehicle into sections in which the steering torque curve steadily rises or falls, detect a first angular acceleration at a beginning of a respective section of the curve by the first steering angle sensor, detect a second angular acceleration at the beginning of the respective section of the curve by the second steering angle sensor, compare the first angular acceleration to the second angular acceleration, and assign a designation of a driver or an automatic control system to a corresponding steering torque curve of the respective section depending on a result of the comparison of the first angular acceleration to the second angular acceleration.

12. The steering system according to claim 11, wherein the first steering angle sensor is configured to detect a movement of the steering rod in a first area between a steering wheel of the vehicle and superposition steering, and wherein the second steering angle sensor is configured to detect a movement of the steering rod mediated by a movement of a toothed rack in a section area between the toothed rack and the superposition steering.

* * * * *